(12) United States Patent
Uematsu et al.

(10) Patent No.: US 10,794,465 B2
(45) Date of Patent: Oct. 6, 2020

(54) ELECTRIC ACTUATOR

(71) Applicant: Nidec Tosok Corporation, Zama-shi, Kanagawa (JP)

(72) Inventors: Yutaka Uematsu, Zama (JP); Kazumi Shinkai, Zama (JP); Shun Kato, Zama (JP); Shuichi Kinjo, Zama (JP); Kohei Osuga, Zama (JP); Tadayuki Hatsuda, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 375 days.

(21) Appl. No.: 15/941,020

(22) Filed: Mar. 30, 2018

(65) Prior Publication Data

US 2018/0283525 A1    Oct. 4, 2018

(30) Foreign Application Priority Data

Mar. 31, 2017    (JP) .................................. 2017-070921

(51) Int. Cl.
| | |
|---|---|
| *H02K 5/15* | (2006.01) |
| *F16H 57/031* | (2012.01) |
| *H02K 7/116* | (2006.01) |
| *H02K 5/173* | (2006.01) |
| *H02K 1/27* | (2006.01) |

(Continued)

(52) U.S. Cl.
CPC .......... *F16H 57/031* (2013.01); *H02K 1/2733* (2013.01); *H02K 5/15* (2013.01); *H02K 5/1732* (2013.01); *H02K 7/116* (2013.01); *F16H 57/029* (2013.01); *F16H 2057/02034* (2013.01); *F16H 2057/02086* (2013.01); *H02K 11/215* (2016.01)

(58) Field of Classification Search
CPC ........ H02K 5/15; H02K 5/1732; H02K 7/116; H02K 11/215
See application file for complete search history.

(56) References Cited

U.S. PATENT DOCUMENTS

| | | | |
|---|---|---|---|
| 5,134,330 A | * | 7/1992 | Haas ........................ F02N 15/00 |
| | | | 29/596 |
| 8,957,559 B2 | * | 2/2015 | Schneider ................ H02K 5/16 |
| | | | 310/43 |

(Continued)

FOREIGN PATENT DOCUMENTS

JP    2016-100910 A    5/2016

*Primary Examiner* — Dang D Le
(74) *Attorney, Agent, or Firm* — Keating & Bennett

(57) ABSTRACT

There is provided an electric actuator in which a speed reduction mechanism and an output portion are disposed adjacent to each other in a radial direction in an opening portion of a housing main body, a cover member has a speed reduction mechanism cover which faces and surrounds the speed reduction mechanism, an output portion cover which faces and surrounds the output portion, and a constricted portion which connects the speed reduction mechanism cover and the output portion cover, the cover member is fixed to the housing main body by a plurality of caulking portions provided on a side wall portion, and, between two adjacent caulking portions interposing the constricted portion therebetween, one of the two caulking portions of the speed reduction mechanism cover is fixed toward a central axis of the speed reduction mechanism, and the other is fixed toward a central axis of the output portion.

9 Claims, 5 Drawing Sheets

(51) Int. Cl.
  *F16H 57/029*  (2012.01)
  *F16H 57/02*  (2012.01)
  *H02K 11/215*  (2016.01)

(56) References Cited

U.S. PATENT DOCUMENTS 10,443,702 B2 * 10/2019 Uematsu ............... F16H 57/027
2016/0238105 A1 * 8/2016 Moore ................... H02K 1/276

* cited by examiner

ELECTRIC ACTUATOR

CROSS REFERENCE TO RELATED APPLICATIONS

This application claims the benefit of priority to Japanese Patent Application No. 2017-070921 filed on Mar. 31, 2017. The entire contents of this application are hereby incorporated herein by reference.

BACKGROUND OF THE INVENTION

1. Field of the Invention

The present invention relates to an electric actuator.

2. Description of the Related Art

In the related art, an actuator that accommodates a motor and a speed reducer in a casing is known.

For example, as described in Japanese Unexamined Patent Application Publication No. 2016-100910, as a casing of an actuator, a configuration in which two casing components are fastened with a bolt is known.

In a case where the casing is assembled by bolt fastening, it is necessary to provide a flange portion or the like for disposing bolt holes for fastening, and there is a problem that the casing becomes large.

SUMMARY OF THE INVENTION

An object of an aspect of the present invention is to provide an electric actuator in which a casing is miniaturized while keeping a fastening force of casing components.

According to an aspect of the present invention, there is provided an electric actuator including: a motor unit that includes a motor having a motor shaft extending in an axial direction; a speed reduction mechanism connected to a side of the motor shaft in the axial direction; an output portion that has an output shaft through which a rotation of the motor shaft is transmitted via the speed reduction mechanism; a housing main body that accommodates the motor unit, the speed reduction mechanism, and the output portion and has an opening portion; and a cover member fixed to the opening portion of the housing main body. The speed reduction mechanism and the output portion are disposed adjacent to each other in a radial direction in the opening portion of the housing main body when viewed in the axial direction. When viewed in the axial direction, the cover member has a speed reduction mechanism cover which faces and surrounds the speed reduction mechanism, an output portion cover which faces and surrounds the output portion, and a constricted portion which connects the speed reduction mechanism cover and the output portion cover to each other. The speed reduction mechanism cover, the output portion cover, and the constricted portion have a lid plate portion which covers the speed reduction mechanism and the output portion in the axial direction, and a tubular side wall portion which extends from an end edge of the lid plate portion to a side of the housing main body in the axial direction. The cover member is fixed to the housing main body by a plurality of caulking portions provided on the side wall portion. Between two adjacent caulking portions interposing the constricted portion therebetween, one of the two caulking portions of the speed reduction mechanism cover is fixed toward a central axis of the speed reduction mechanism, and the other of the two caulking portions of the output portion cover is fixed toward a central axis of the output portion.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Hereinafter, the electric actuator of an embodiment will be described with reference to the drawings.

Figure 1:
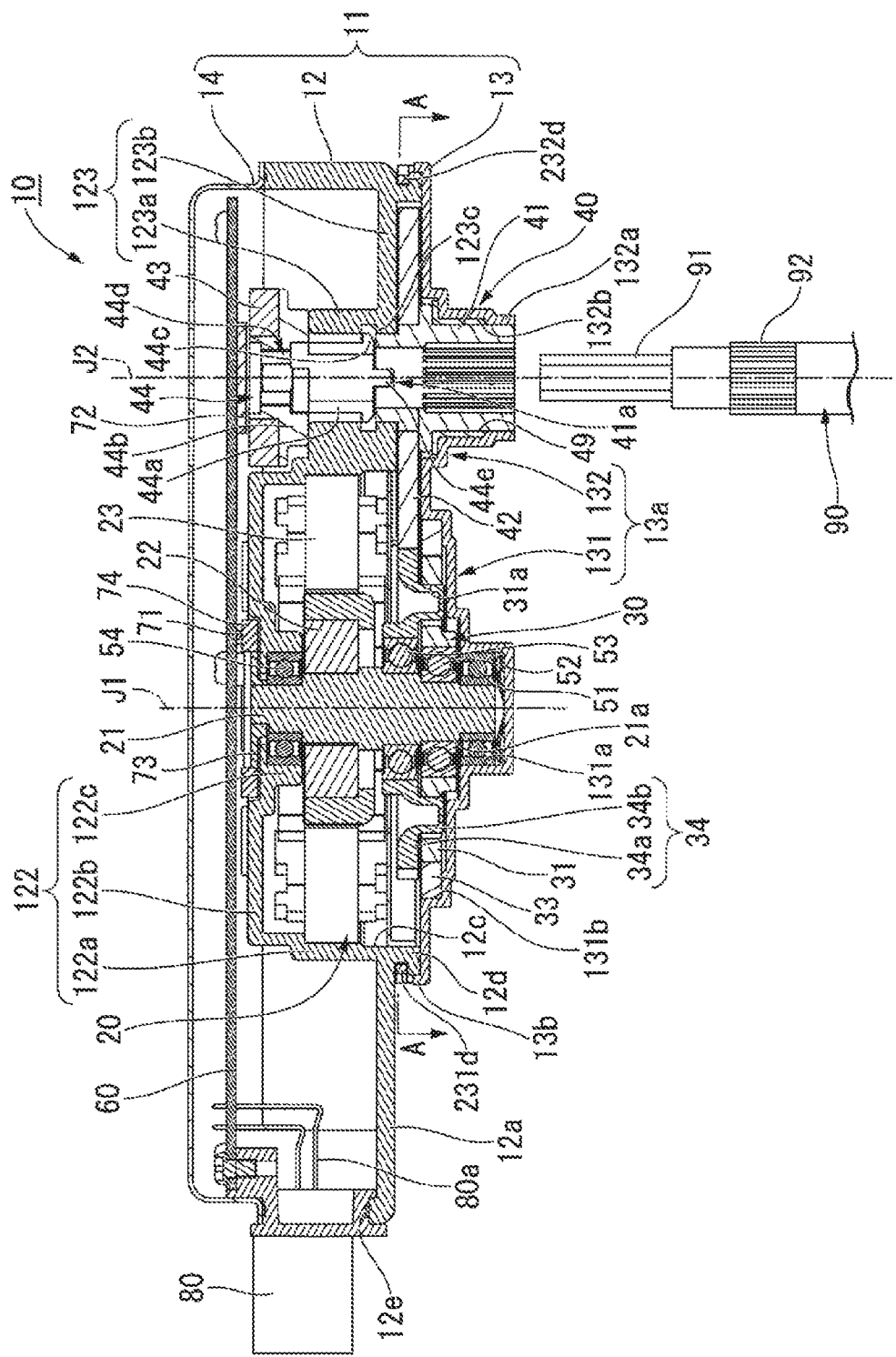
FIG. 1 is a sectional view of an electric actuator of an embodiment.

FIG. 1 is a sectional view of an electric actuator according to this embodiment.

The electric actuator 10 of this embodiment is used by being connected to a driven shaft 90. The electric actuator 10 rotates the driven shaft 90 around axis thereof.

The electric actuator 10 includes a housing 11, a motor unit 20 which has a motor shaft 21 extending in the axial direction of a first central axis J1, a speed reduction mechanism 30, an output portion 40, a control board 60, a first bearing 51, a second bearing 52, a third bearing 53, a fourth bearing 54, and an external connector 80. The first bearing 51 to the fourth bearing 54 are, for example, ball bearings. The axial direction of the first central axis J1 is parallel to an up and down direction in FIG. 1.

In the following description, the axial direction of the first central axis J1 is simply referred to as "axial direction", and the upper side of FIG. 1 in the axial direction is simply referred to as "upper side" and the lower side of FIG. 1 in the axial direction is simply referred to as "lower side". In addition, the radial direction about the first central axis J1 is simply referred to as "radial direction", and the circumferential direction about the first central axis J1 is simply referred to as "circumferential direction". The upper side and the lower side are merely names for explaining the relative positional relationship between the respective portions, and the actual disposition relationship or the like may be a disposition relationship or the like other than the disposition relationship or the like indicated by these names. The lower side corresponds to one side in the axial direction, and the upper side corresponds to the other side in the axial direction.

The housing 11 has a housing main body 12 that accommodates the motor unit 20, a speed reduction mechanism 30, and an output portion 40, a lower cover member 13 that is disposed on the lower side of the housing main body 12, and an upper cover member 14 that is disposed on the upper side of the housing main body 12.

The housing main body 12 is a bottomed box-shaped container opened to the upper side. The housing main body 12 has a bottom wall 12a expanding in a direction orthogonal to the first central axis J1 and a circumferential wall 12b extending upward from the outer circumferential end of the bottom wall 12a. The bottom wall 12a has a through-hole 12c which passes through the bottom wall 12a in the axial direction and a tubular protrusion wall portion 12d which extends downward in the axial direction from the end edge of the through-hole 12c. In other words, the housing 11 has the through-hole 12c and the protrusion wall portion 12d.

The housing main body 12 has a motor holding portion 122 which holds the motor unit 20 and an output portion holding portion 123 which holds the output portion 40. The motor holding portion 122 and the output portion holding portion 123 are disposed in parallel in the radial direction in the through-hole 12c. The housing main body 12 has a through portion 12e passing through the circumferential wall 12b in the radial direction. An external connector 80 is inserted into the through portion 12e and fixed thereto.

The motor holding portion 122 has a cylindrical tube portion 122a extending in the axial direction and an annular lid portion 122b expanding inward from the upper end of the tube portion 122a in the radial direction. The opening portion on the lower side of the tube portion 122a is positioned in the through-hole 12c. The tube portion 122a surrounds the outer side of the motor unit 20 in the radial direction. The lid portion 122b covers the upper side of the motor unit 20. The lid portion 122b has a cylindrical bearing holding portion 122c that holds the fourth bearing 54 in the center.

The output portion holding portion 123 is disposed adjacent to the motor holding portion 122 in the through-hole 12c in the radial direction. The output portion holding portion 123 includes a cylindrical tube portion 123a extending in the axial direction about the second central axis J2, and a supporting wall portion 123b expanding from the lower end of the tube portion 123a outward in the radial direction and connected to a circumferential edge of the through-hole 12c.

The protrusion wall portion 12d surrounding the through-hole 12c accommodates a portion of gears of the speed reduction mechanism 30 and the output portion 40. Among a region surrounded by the protrusion wall portion 12d, a region that overlaps the motor holding portion 122 in the axial direction is a region that accommodates gears of the speed reduction mechanism 30 and a region that overlaps the output portion holding portion 123 in the axial direction is a region which accommodates gears of the output portion 40.

The lower cover member 13 is fixed to the protrusion wall portion 12d of the housing main body 12. The lower cover member 13 closes the through-hole 12c from the lower side. The lower cover member 13 has a lid plate portion 13a expanding in a direction orthogonal to the axial direction and a tubular side wall portion 13b extending upward from an end edge of the lid plate portion 13a in the axial direction. The side wall portion 13b surrounds the outer periphery of the protrusion wall portion 12d of the housing main body 12 and faces in a direction orthogonal to the axial direction. The side wall portion 13b of the lower cover member 13 is caulked and fixed to the protrusion wall portion 12d at a plurality of positions.

The lower cover member 13 has a speed reduction mechanism cover 131 for covering the speed reduction mechanism 30 in the axial direction and an output portion cover 132 for covering the output portion 40 in the axial direction.

The speed reduction mechanism cover 131 is in a form of a disk about the first central axis J1 when viewed from the lower side. The speed reduction mechanism cover 131 has a plurality of accommodation recessed portions 131a and 131b that are recessed downward. Both of the accommodation recessed portions 131a and 131b are bottomed cylindrical shapes about the first central axis J1. The accommodation recessed portion 131a is disposed in the center portion in the radial direction and accommodates the first bearing 51. The accommodation recessed portion 131b is positioned above the accommodation recessed portion 131b and accommodates the gears of the speed reduction mechanism 30.

The output portion cover 132 is in a form of a disk about the second central axis J2, when viewed from the lower side. The output portion cover 132 has a cylindrical tube portion 132a extending downward in the axial direction about the second central axis J2. The tube portion 132a has a through-hole 132b passing through the output portion cover 132. A cylindrical bush 49 is disposed in the tube portion 132a. The bush 49 is fitted in the through-hole 132b. The bush 49 has a flange portion projecting outwardly at an upper end portion thereof in the radial direction. The flange portion of the bush 49 comes into contact with the upper surface of the output portion cover 132 from above.

The upper cover member 14 is fixed to the upper end portion of the circumferential wall 12b of the housing main body 12. The upper cover member 14 closes the upper opening of the housing main body 12. The control board 60 is disposed between the upper surface of the motor holding portion 122 and the upper cover member 14. The control board 60 has a plate shape that expands in a direction orthogonal to the axial direction. The control board 60 is fixed to a position covering the motor holding portion 122 and the output portion holding portion 123 from the upper side in the housing main body 12. The control board 60 is electrically connected to a coil wire extending from the motor unit 20 and a metal terminal 80a extending from the external connector 80.

The motor unit 20 has the motor shaft 21, a rotor 22, and a stator 23. The motor shaft 21 is rotatably supported around the first central axis J1 by the first bearing 51 and the fourth bearing 54. The motor shaft 21 extends downward from the rotor 22 and is connected to the speed reduction mechanism 30.

The rotor 22 has a cylindrical rotor core fixed to the outer circumferential surface of the motor shaft 21 and a magnet fixed to the outer circumferential surface of the rotor core. The stator 23 includes an annular stator core that surrounds the outer side of the rotor 22 in the radial direction, and a plurality of coils that are attached to the stator core. The stator 23 is fixed to the inner circumferential surface of the tube portion 122a.

A ring-shaped sensor magnet 74 for the motor unit is attached to the upper end of the motor shaft 21 via a magnet holder 73. The magnet holder 73 and the sensor magnet 74 for the motor unit are disposed between the lid portion 122b of the motor holding portion 122 and the control board 60. A motor unit sensor 71 is disposed at a position facing the sensor magnet 74 for the motor unit in the control board 60. The motor unit sensor 71 is, for example, a Hall element or a magnetoresistive element (MR element). For example, three motor unit sensors 71 each comprising a Hall element are disposed around the axis of the first central axis J1.

The speed reduction mechanism 30 is disposed below the motor unit 20. The motor shaft 21 passes through the speed reduction mechanism 30 in the axial direction. The speed reduction mechanism 30 is disposed outward of the lower portion of the motor shaft 21 in the radial direction. The speed reduction mechanism is accommodated between the motor unit 20 and the speed reduction mechanism cover 131. The speed reduction mechanism 30 has an external gear 31, an internal gear 33, and an output gear 34.

The external gear 31 has a substantially annular plate shape expanding in a plane orthogonal to the axial direction about an eccentric portion 21a of the motor shaft 21. A gear portion is provided on the outer side surface of the external gear 31 in the radial direction. The external gear 31 is connected to the eccentric portion 21a via the second bearing 52. The external gear 31 has a plurality of pin holes 31a passing through the external gear 31 in the axial direction. For example, eight pin holes 31a are provided. The plurality of pin holes 31a are disposed at equal intervals around the central axis of the external gear 31 over the entire circumference thereof.

The internal gear 33 is fixed while surrounding the outside of the external gear 31 in the radial direction and meshes with the external gear 31. The internal gear 33 is substantially annular about the first central axis J1. The outer shape of the internal gear 33 is a polygonal shape (a regular dodecagonal shape in this embodiment) and is fitted and fixed to the accommodation recessed portion 131b of the speed reduction mechanism cover 131 having the same polygonal shape. A gear portion is provided on the inner circumferential surface of the internal gear 33. The gear portion of the internal gear 33 meshes with the gear portion of the external gear 31.

The output gear 34 is an external gear disposed on the upper side of the external gear 31. The output gear 34 has an annular portion 34a and a plurality of carrier pins 34b. The annular portion 34a is an annular plate shape which expands in the radial direction about the first central axis J1. Each of the plurality of carrier pins 34b has a columnar shape protruding downward from the lower surface of the annular portion 34a. For example, eight carrier pins 34b are provided. The plurality of carrier pins 34b are disposed at equal intervals about the first central axis J1 over the entire circumference of the output gear 34. The carrier pin 34b is inserted into corresponding one of the pin holes 31a. The output gear 34 meshes with a drive gear 42 to be described below.

The output portion 40 is a portion that outputs the driving force of the electric actuator 10. The output portion 40 includes an output shaft 41, a drive gear 42, a sensor magnet 43 for an output portion, and a magnet holder 44. The output portion is held in the output portion holding portion 123, and the output portion cover 132.

The output shaft 41 has a cylindrical shape extending along the second central axis J2. The output shaft 41 has spline grooves in the lower portion of the inner circumferential surface thereof. The output shaft 41 has a recessed portion 41a recessed in the axial direction at an upper end thereof. The drive gear 42 is fixed to the outer circumferential surface of the output shaft 41. The drive gear 42 is in a shape of an annular plate expanding about the second central axis J2 in the radial direction. The lower portion of the output shaft 41 is inserted into the bush 49 of the output portion cover 132 from the upper side. The upper portion of the output shaft 41 is inserted from the lower side into the tube portion 123a of the output portion holding portion 123.

The magnet holder 44 is a substantially cylindrical member extending along the second central axis J2. The magnet holder 44 has a tube portion 44a extending in the axial direction and an annular flange portion 44b expanding from the upper portion of the tube portion 44a in the radial direction. An annular sensor magnet 43 for the output portion is fixed to the upper surface of the flange portion 44b.

The tube portion 44a of the magnet holder 44 is inserted into the tube portion 123a of the output portion holding portion 123. The magnet holder 44 has a movement suppression portion 44c that is a protrusion protruding outward from the outer circumferential surface of the lower end portion of the tube portion 44a in the radial direction. The movement suppression portion 44c is inserted into a recessed groove 123c provided on the inner circumferential surface of the tube portion 123a and extending in the circumferential direction thereof. The movement suppression portion 44c suppresses the axial movement of the magnet holder 44. The magnet holder 44 has a hexagonal hole portion 44d having a hexagonal cross section on the upper side of the inner circumferential surface. The magnet holder 44 has a protrusion portion 44e protruding downward in the axial direction at the lower end of the tube portion 44a. The protrusion portion 44e is inserted into the recessed portion 41a of the output shaft 41.

The sensor magnet 43 for the output portion is disposed between the output portion holding portion 123 and the control board 60. An output portion sensor 72 is disposed at a position facing the sensor magnet for output portion 43 in the control board 60. The output portion sensor 72 is, for example, an MR element. As the output portion sensor 72, an MR element and a Hall element may be used in combination.

The output portion 40 is connectable with the driven shaft 90. The driven shaft 90 has a hexagonal portion 91 having a regular hexagonal cross-section and a spline portion 92 positioned on the lower side (proximal end side of driven shaft 90) than the hexagonal portion 91, at a distal end portion inserted into the electric actuator 10. When the hexagonal portion 91 is fitted into the hexagonal hole portion 44d of the magnet holder 44, the driven shaft 90 and the magnet holder 44 are connected to each other. In addition, the spline portion 92 and the spline grooves of the output shaft 41 are fitted to each other, whereby the driven shaft 90 and the output shaft 41 are connected to each other.

Hereinafter, the housing structure of the electric actuator 10 of this embodiment will be described in detail.

Figure 2:
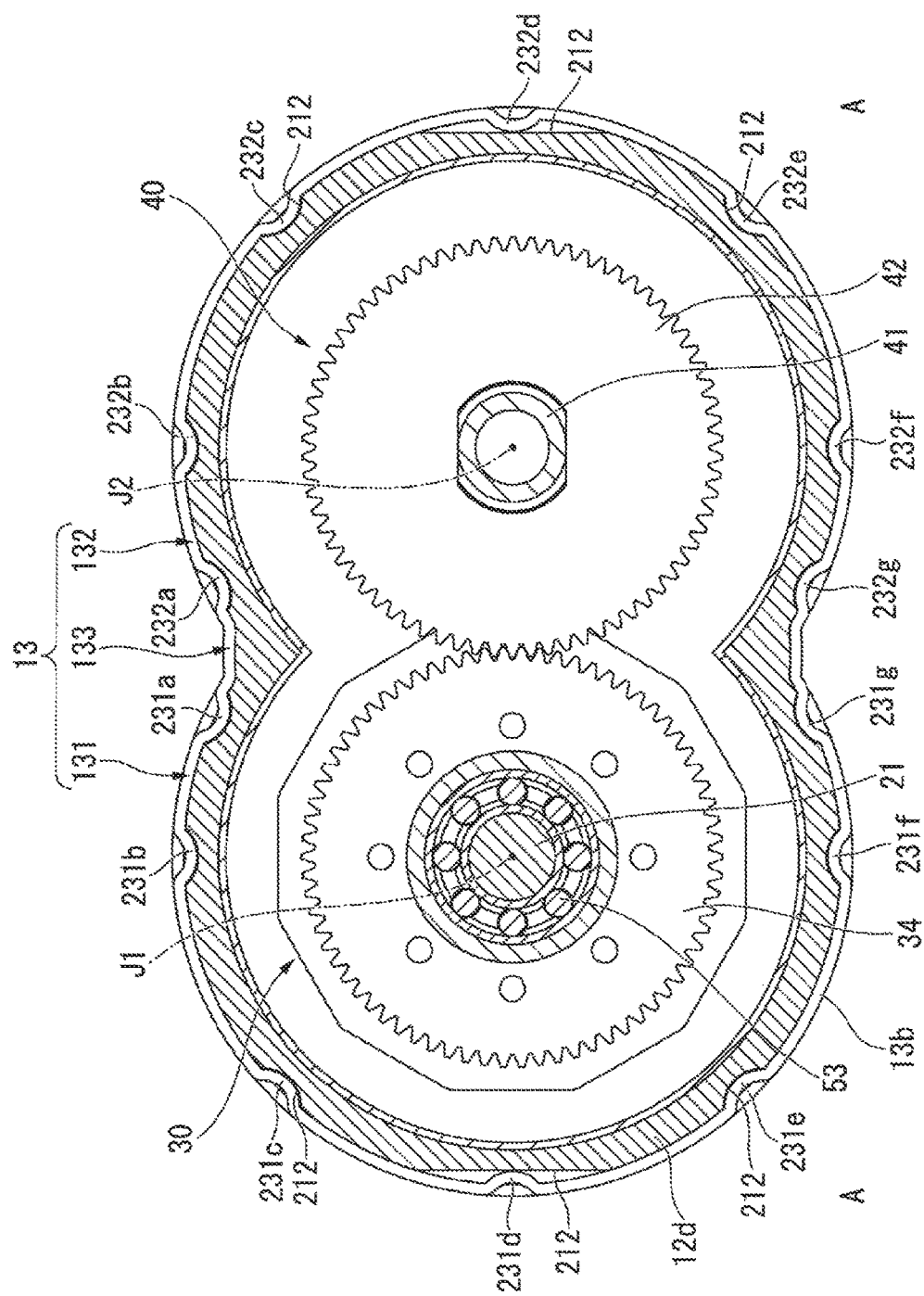
FIG. 2 is a sectional view taken along line A-A in FIG. 1.
Figure 3:
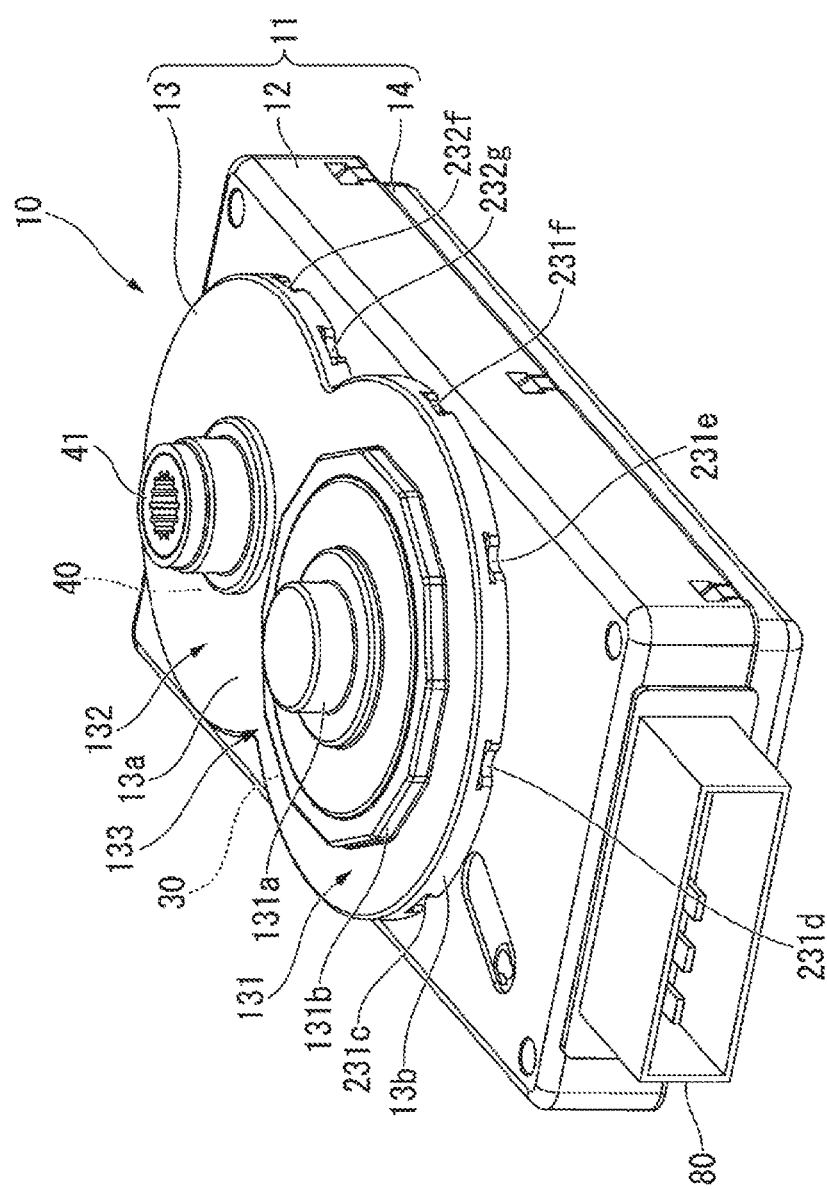
FIG. 3 is a perspective view of the electric actuator.
Figure 4:
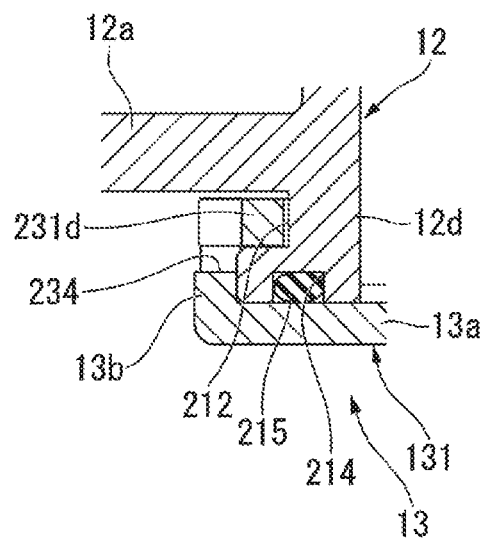
FIG. 4 is an enlarged sectional view of a caulking portion.

FIG. 2 is a sectional view taken along line A-A in FIG. 1. FIG. 3 is a perspective view of the electric actuator. FIG. 4 is an enlarged sectional view of a caulking portion.

As shown in FIGS. 2 and 3, the lower cover member 13 of the electric actuator 10 has a speed reduction mechanism cover 131, an output portion cover 132, a constricted portion 133 connecting the speed reduction mechanism cover 131 and the output portion cover 132. Therefore, the speed reduction mechanism cover 131, the output portion cover 132, and the constricted portion 133 have the lid plate portion 13a and the side wall portion 13b. As shown in FIG. 2, the speed reduction mechanism cover 131 and the output portion cover 132 each has an approximately circular outer shape when viewed in the axial direction, and have a line symmetrical shape with the constricted portion 133 interposed therebetween.

The lower cover member 13 of the electric actuator 10 is fixed to the housing main body 12 by a plurality of caulking portions 231a to 231g and 232a to 232g. By a configuration in which the lower cover member 13 is caulked and fixed, bolt fastening between the lower cover member 13 and the housing main body 12 becomes unnecessary. This eliminates the need for the flange portion and the bolt itself for bolt fastening, which makes it possible to miniaturize the housing 11 and reduce the number of components.

The caulking portions 231a to 231g and 232a to 232g have a common structure. In the following description, the caulking portion 231d will be cited, and the structure of the caulking portion will be described with reference to FIG. 4.

The caulking portion 231d is positioned at the upper-end portion of the side wall portion 13b of the lower cover member 13. The side wall portion 13b has a slit 234 passing through the side wall portion 13b in a direction orthogonal to the axial direction. The slit 234 extends along the circumferential direction of the lower cover member 13. The caulking portion 231d is positioned above the slit 234 and is a belt-like portion extending in the circumferential direction.

A recessed portion 212 recessed in a direction orthogonal to the axial direction is provided on the outer circumferential surface of the protrusion wall portion 12d at a position facing the caulking portion 231d. The caulking portion 231d is pushed from the outside by an indenter or the like, plastically deformed into an arc shape as shown in FIG. 2, and is fitted into the recessed portion 212 as shown in FIG. 4. Since the caulking portion 231d is positioned in the recessed portion 212, the vertical movement of the lower cover member 13 is suppressed.

On the outer circumferential surface of the protrusion wall portion 12d, recessed portions 212 corresponding to the caulking portions 231a to 231g and 232a to 232g are provided in a one-to-one correspondence. The other caulking portions 231a to 231c and 231e to 231g and 232a to 232g are plastically deformed by an indenter or the like similarly to the caulking portion 231d, and each is fitted into the corresponding recessed portion 212. Accordingly, the lower cover member 13 is fixed to the housing main body 12.

In the speed reduction mechanism cover 131, the caulking portion 231d positioned furthest from the constricted portion 133 is positioned on a straight line connecting the first central axis J1 and the second central axis J2 when viewed in the axial direction. Five caulking portions 231b to 231f are disposed at an interval of 45° in the circumferential direction about the caulking portion 231d. The two caulking portions 231a and 231g are disposed in the vicinity of the constricted portion 133.

The caulking portions 232a to 232g of the output portion cover 132 are disposed at positions line-symmetrical with the caulking portions 231a to 232g of the speed reduction mechanism cover 131 with the constricted portion 133 interposed therebetween. Therefore, the caulking portion 232d farthest from the constricted portion 133 is positioned on a straight line connecting the first central axis J1 and the second central axis J2 when viewed in the axial direction.

In the lower cover member 13, the two caulking portions 231d and 232d, the first central axis J1 and the second central axis J2 are aligned on one straight line when viewed in the axial direction. Even if the caulking portions 231d and 232d facing each other disposed as described above are strongly pushed, the positions of the caulking portions 231d and 232d with respect to the first central axis J1 and the second central axis J2 are not shifted, so that the caulking portions 231d and 232d can be strongly caulked and fixed. By providing the caulking portions 231d and 232d, the lower cover member 13 can be firmly fixed to the housing main body 12.

As shown in FIG. 2, the seven caulking portions 231a to 231g of the speed reduction mechanism cover 131 are pushed toward the first central axis J1 and caulked and fixed. In other words, three or more caulking portions are caulked and fixed toward the central axis of the speed reduction mechanism 30.

In addition, the seven caulking portions of the output portion cover 132 are pushed toward the second central axis J2 and caulked and fixed. In other words, three or more caulking portions are caulked and fixed toward the central axis of the output portion 40.

According to the above configuration, the speed reduction mechanism cover 131 and the output portion cover 132 can be equally caulked and fixed in their respective circumferential directions, and floating of a portion of the lower cover member 13 can be suppressed at the time of fastening.

In the electric actuator 10, among the caulking portions 231a, 232a, 231g, and 232g adjacent to each other with the constricted portion 133 interposed therebetween, the caulking portions 231a and 231g of the speed reduction mechanism cover 131 are fixed toward the first central axis J1 which is the central axis of the speed reduction mechanism 30. The caulking portions 232a and 232g of the output portion cover 132 are fixed toward the second central axis J2 which is the central axis of the output portion 40. With this configuration, it is possible to caulk and fix by applying evenly a force to the left and right sides of the constricted portion 133. Accordingly, the caulking and fixing in a state where the position is biased to either one of the speed reduction mechanism cover 131 and the output portion cover 132 can be suppressed, and the lower cover member 13 can be firmly fixed to an accurate position.

The electric actuator 10 has a recessed groove 214 recessed upward on an end surface facing the lower side of the protrusion wall portion 12d. The recessed groove 214 surrounds the periphery of the through-hole 12c over a whole circumference thereof. A seal member 215 is disposed in the recessed groove 214. Therefore, the electric actuator 10 has the seal member 215 extending along the edge of the opening portion of the housing main body 12. The seal member 215 is an O ring, for example.

The lower cover member 13 is fixed by interposing the seal member 215 between the lower cover member 13 and the protrusion wall portion 12d of the housing main body 12. With this configuration, the connection portion between the lower cover member 13 and the housing main body 12 can be sealed, so that entry of moisture or the like into the housing can be suppressed.

In this embodiment, as shown in FIG. 4, the lower cover member 13 is fixed to the housing main body 12 in a state where the seal member 215 is compressed in the up and down direction. With this configuration, even in a case where the housing main body 12 and the lower cover member 13 are expanded and contracted due to a temperature change, the sealed state by the seal member 215 can be kept.

In the electric actuator 10, the lower cover member 13 may be pressed into the protrusion wall portion 12d which is the opening portion of the housing main body 12. Accordingly, the protrusion wall portion 12d and the side wall portion 13b are fitted and aligned. On the other hand, in the configuration in which the lower cover member 13 is pressed into the protrusion wall portion 12d since a force pushing the side wall portion 13b in the outer circumferential direction always acts, the lower cover member 13 is likely to float. In this regard, in this embodiment, since the speed reduction mechanism cover 131 and the output portion cover 132 are equally fixed by the caulking portions 231a to 231g and 232a to 232g, respectively, the floating of the lower cover member 13 at a specific position can be suppressed and the lower cover member 13 can be firmly fixed with high accuracy.

In the electric actuator 10, the speed reduction mechanism cover 131 has an accommodation recessed portion 131a for holding the first bearing 51. In this configuration, since the speed reduction mechanism cover 131 also serves as a bearing holder, it is necessary to precisely align the speed reduction mechanism cover 131 and the housing main body 12. In this embodiment, since the caulking portions 231a to 231g of the speed reduction mechanism cover 131 are fixed toward the first central axis J1, the center of the first bearing 51 can be easily aligned with respect to the first central axis J1.

Figure 5:
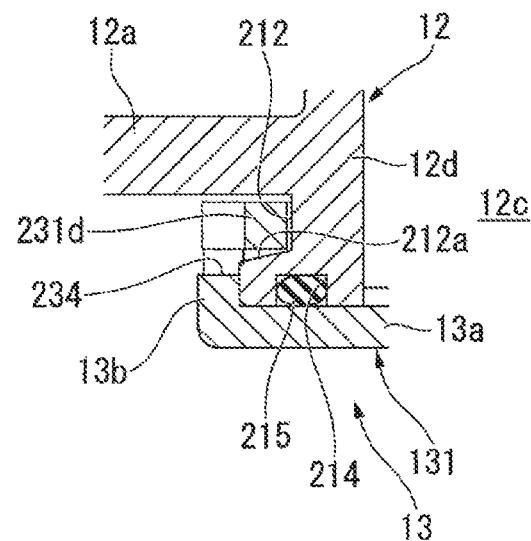
FIG. 5 is an enlarged sectional view of a caulking structure according to a first modification example.

FIG. 5 is an enlarged sectional view of a caulking structure according to a first modification example.

In the caulking structure of the first modification example, as shown in FIG. 5, among the wall surface of the recessed portion 212 of the protrusion wall portion 12d, the wall surface 212a positioned on the lower cover member 13 side is an inclined surface which intersects the plane orthogonal to the axial direction. More specifically, the wall surface 212a is an inclined surface going away from the lid plate portion 13a of the lower cover member 13 as going toward a side of the through-hole 12c, which is the opening portion of the housing main body 12.

By providing the configuration described above, when the caulking portion 231d is pushed into the recessed portion 212 with an indenter or the like, the caulking portion 231d is pushed into the back of the recessed portion 212 while being guided by the inclination of the wall surface 212a and being moved to the upper side. Then, a force for pressing the lower cover member 13 against the protrusion wall portion 12d acts, and the seal member 215 can be compressed. Therefore, according to the first modification example, the seal member 215 can be gradually compressed while caulking the caulking portions 231a to 231g and 232a to 232g, and the sealed state by the seal member 215 can be reliably obtained.

Figure 6:
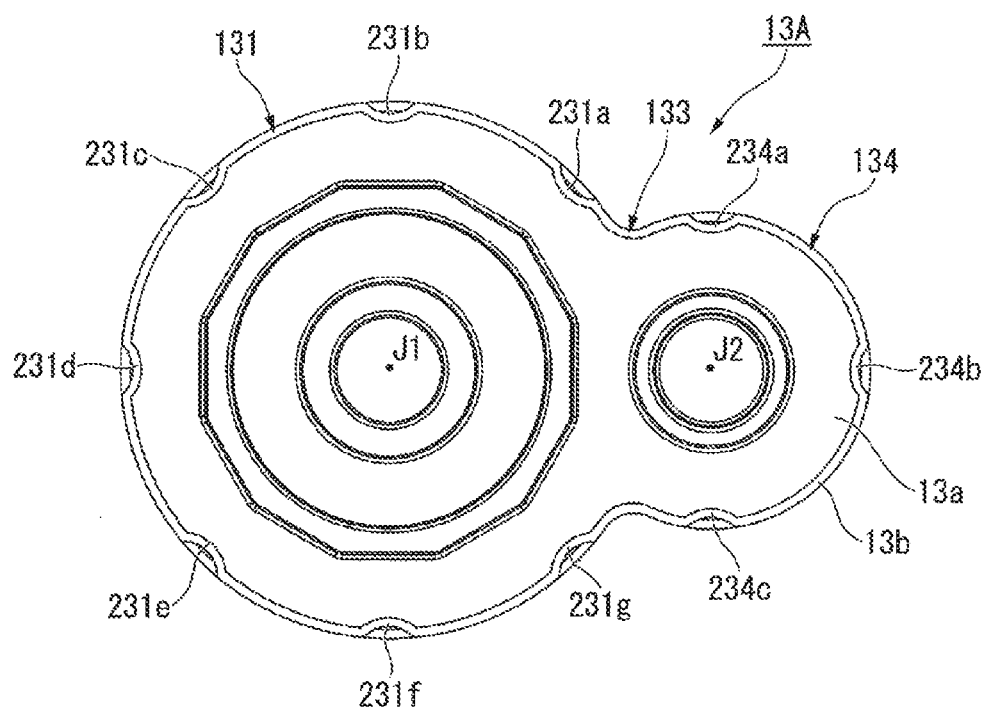
FIG. 6 is a plan view of a lower cover member according to a second modification example.
Figure 7:
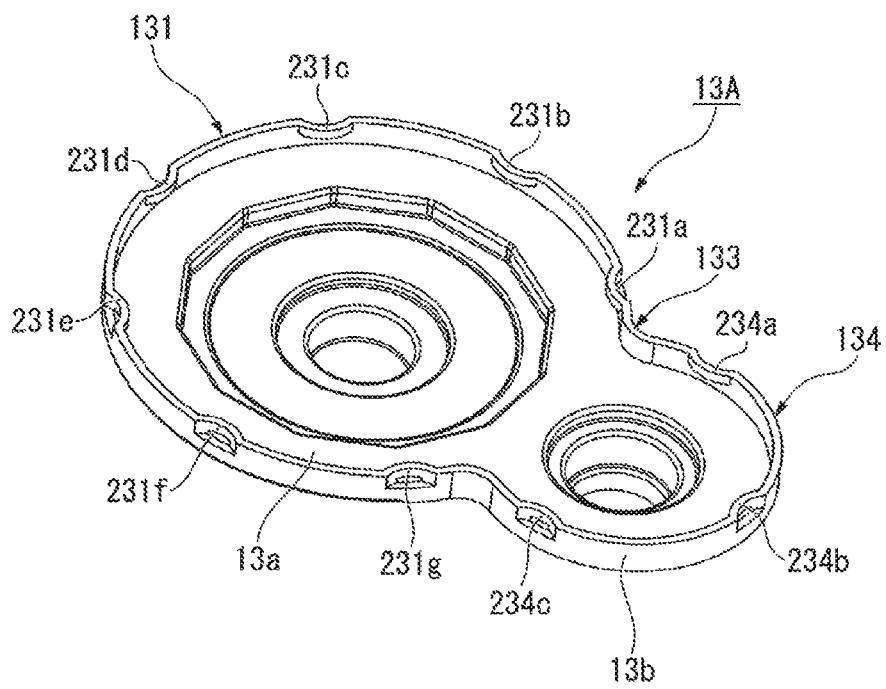
FIG. 7 is a perspective view of the lower cover member according to the second modification example.

FIG. 6 is a plan view of a lower cover member according to a second modification example. FIG. 7 is a perspective view of a lower cover member according to a second modification example.

The lower cover member 13A according to the second modification example has a speed reduction mechanism cover 131, an output portion cover 134, and a constricted portion 133 connecting the speed reduction mechanism cover 131 and the output portion cover 134. The output portion cover 134 is generally circular in outer shape. Compared with the speed reduction mechanism cover 131, the output portion cover 134 has a smaller area when viewed in the axial direction.

The output portion cover 134 has three caulking portions 234a to 234c. The caulking portions 234a to 234c are caulked and fixed toward the second central axis J2 which is the central axis of the output portion 40. The caulking portion 234b farthest from the constricted portion 133 is positioned on the same straight line as the caulking portion 231d of the speed reduction mechanism cover 131, the first central axis J1, and the second central axis J2. The caulking portions 234a to 234c are disposed at equal intervals of approximately 90° in the circumferential direction of the output portion cover 134.

In the lower cover member 13A of the second modification example, among the speed reduction mechanism cover 131 and the output portion cover 134, a larger number of caulking portions 231a to 231g are disposed on the speed reduction mechanism cover 131 having a large area when viewed in the axial direction than the output portion cover 134. By adjusting the number of caulking portions according to the area of the speed reduction mechanism cover 131 and the output portion cover 134, uneven application of the stress at the time of caulking and fixing can be suppressed, and both the speed reduction mechanism cover 131 and the output portion cover 134 can be evenly caulked and fixed. Accordingly, it is possible to firmly fix the lower cover member 13A to the housing main body 12 while suppressing lifting of the lower cover member 13A.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric actuator comprising:
   a motor unit that includes a motor having a motor shaft extending in an axial direction;
   a speed reduction mechanism connected to a side of the motor shaft in the axial direction;
   an output portion that has an output shaft through which a rotation of the motor shaft is transmitted via the speed reduction mechanism;
   a housing main body that accommodates the motor unit, the speed reduction mechanism, and the output portion and has an opening portion; and
   a cover member fixed to the opening portion of the housing main body,
   wherein the speed reduction mechanism and the output portion are disposed adjacent to each other in a radial direction in the opening portion of the housing main body when viewed in the axial direction,
   wherein, when viewed in the axial direction, the cover member has
      a speed reduction mechanism cover which faces and surrounds the speed reduction mechanism,
      an output portion cover which faces and surrounds the output portion, and
      a constricted portion which connects the speed reduction mechanism cover and the output portion cover to each other,
   wherein the speed reduction mechanism cover, the output portion cover, and the constricted portion have
      a lid plate portion which covers the speed reduction mechanism and the output portion in the axial direction, and
      a tubular side wall portion which extends from an end edge of the lid plate portion to a side of the housing main body in the axial direction,
   wherein the cover member is fixed to the housing main body by a plurality of caulking portions provided on the side wall portion, and
   wherein, between two adjacent caulking portions interposing the constricted portion therebetween, one of the two caulking portions of the speed reduction mechanism cover is fixed toward a central axis of the speed reduction mechanism, and the other of the two caulking portions of the output portion cover is fixed toward a central axis of the output portion.

2. The electric actuator according to claim 1,
wherein the speed reduction mechanism cover has at least three caulking portions caulked and fixed toward the central axis of the speed reduction mechanism, and
wherein the output portion cover has at least three caulking portions caulked and fixed toward the central axis of the output portion.

3. The electric actuator according to claim 2,
wherein two caulking portions are caulked and fixed in a direction in which the two caulking portions face each other, and are disposed in alignment with the central axis of the speed reduction mechanism and the central axis of the output portion when viewed in the axial direction.

4. The electric actuator according to claim 1,
wherein the speed reduction mechanism cover holds a bearing which supports the motor shaft.

5. The electric actuator according to claim 4,
wherein a larger number of the caulking portions are disposed on one of the speed reduction mechanism cover and the output portion cover, the one having a larger area when viewed in the axial direction than the other of the speed reduction mechanism cover and the output portion cover.

6. The electric actuator according to claim 5,
wherein the cover member is pressed into the opening portion of the housing main body.

7. The electric actuator according to claim 6, further comprising
a seal member that extends along an edge of the opening portion of the housing main body,
wherein the cover member and the housing main body are fixed with the seal member interposed therebetween.

8. The electric actuator according to claim 7,
wherein the cover member is fixed to the housing main body in a state of compressing the seal member in the axial direction.

9. The electric actuator according to claim 7,
wherein the housing main body has a recessed portion recessed in a direction orthogonal to the axial direction at a position corresponding to that of the caulking portion, and
wherein a wall surface of the recessed portion on a side of the cover member is an inclined surface going away from the cover member as going inward of the opening portion.

* * * * *